United States Patent
Misawa et al.

(10) Patent No.: US 9,807,280 B2
(45) Date of Patent: Oct. 31, 2017

(54) IMAGE PROCESSING APPARATUS, METHOD, AND STORAGE MEDIUM

(71) Applicant: CANON KABUSHIKI KAISHA, Tokyo (JP)

(72) Inventors: Reiji Misawa, Tokyo (JP); Koya Shimamura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/571,833

(22) Filed: Dec. 16, 2014

(65) Prior Publication Data

US 2015/0181077 A1 Jun. 25, 2015

(30) Foreign Application Priority Data

| Dec. 19, 2013 | (JP) | 2013-262763 |
| Mar. 17, 2014 | (JP) | 2014-054163 |
| Jul. 7, 2014 | (JP) | 2014-139870 |

(51) Int. Cl.

| *G06K 15/00* | (2006.01) |
| *H04N 1/40* | (2006.01) |
| *H04N 1/403* | (2006.01) |
| *H04N 1/405* | (2006.01) |
| *H04N 1/64* | (2006.01) |

(Continued)

(52) U.S. Cl.
CPC ............ *H04N 1/403* (2013.01); *G06K 9/342* (2013.01); *G06K 9/44* (2013.01); *G06T 5/30* (2013.01); *G06T 7/13* (2017.01); *G06T 7/136* (2017.01); *H04N 1/405* (2013.01); *H04N 1/40062* (2013.01); *H04N 1/642* (2013.01); *H04N 1/648* (2013.01); *G06K 2209/01* (2013.01);

(Continued)

(58) Field of Classification Search
None
See application file for complete search history.

(56) References Cited

U.S. PATENT DOCUMENTS

| 4,953,013 A | * | 8/1990 | Tsuji | H04N 1/46 |
| | | | | 358/447 |
| 5,432,870 A | * | 7/1995 | Schwartz | H04N 1/41 |
| | | | | 375/E7.09 |

(Continued)

FOREIGN PATENT DOCUMENTS

| JP | 6-68301 A | 3/1994 |
| JP | 2002-77633 A | 3/2002 |

*Primary Examiner* — Vincent Rudolph
*Assistant Examiner* — Michael Burleson
(74) *Attorney, Agent, or Firm* — Canon U.S.A., Inc. IP Division

(57) ABSTRACT

A binary image of an input image is generated, and a character region within the binary image and a region surrounding each character are acquired as character segmentation rectangle information. A thinning process is executed on a region within the binary image which is identified based on the character segmentation rectangle information to acquire a thinned image. An edge detected image of the region identified based on the character segmentation rectangle information is acquired. Whether each character identified based on the character segmentation rectangle information is a character to be separated from a background by the binarization process or not is determined based on a result of a logical AND of the thinned image and the edge detected image.

9 Claims, 16 Drawing Sheets

(51) Int. Cl.
*G06T 5/30* (2006.01)
*G06K 9/34* (2006.01)
*G06K 9/44* (2006.01)
*G06T 7/13* (2017.01)
*G06T 7/136* (2017.01)

(52) U.S. Cl.
CPC ............... *G06T 2207/10008* (2013.01); *G06T 2207/30176* (2013.01)

(56) References Cited

U.S. PATENT DOCUMENTS

| | | | |
|---|---|---|---|
| 5,832,141 A * | 11/1998 | Ishida et al. | 382/298 |
| 2010/0226588 A1* | 9/2010 | So et al. | 382/238 |
| 2013/0259363 A1* | 10/2013 | Ozawa et al. | 382/164 |

* cited by examiner

FIG. 10

| INPUT IMAGE | EDGE-DETECTED IMAGE | THINNED IMAGE | LOGICAL AND IMAGE |
|---|---|---|---|
| 1101 LARGE CHARACTER | 1102 | 1103 | 1104 |
| 1105 SMALL CHARACTER | 1106 | 1107 | 1108 |
| 1109 LARGE CHARACTER | 1110 | 1111 | 1112 |

FIG. 12

IMAGE PROCESSING APPARATUS, METHOD, AND STORAGE MEDIUM

BACKGROUND OF THE INVENTION

Field of the Invention

The present disclosure generally relates to image processing and, more particularly, to an image processing apparatus, an image processing method, and a storage medium storing a program for determining a character within an image.

Description of the Related Art

In recent years, an increased number of colored documents are made available because of wide spreads of color printers and color scanners, for example. There are more chances to capture and store such documents as electronic files by scanning and transmit them to a third party over the Internet, for example. However, because direct storage of full-color data may impose a large load on an apparatus and lines, such data may need to be compressed to reduce its data amount.

In the past, methods for compressing a color image may include, for example, a method including converting a color image to a binary image having a pseudo-gray scale by using an error diffusion method or the like and compressing the binary image, a method including compressing in JPEG, and a method including converting a color image with 8-bit palette colors for ZIP compression or LZW compression.

According to Japanese Patent Laid-Open No. 2002-077633, a character region contained in an input image is detected, and the detected character region is converted to a binary image, is MMR compressed (binary non-reversible compressed) and is stored in a file along with character color information on characters therein. Furthermore, an image having the character region filled with a surrounding color on the input image is JPEG compressed (non-reversible compressed) by reducing its resolution and is stored in the file as a background image. The file compressed by this compression method may provide the character region in high quality and may contribute to a greater compression rate.

According to Japanese Patent Laid-Open No. 2002-077633, in order to detect a character region, whether each set of black pixels in a binary image acquired by binarizing an input image possibly corresponds to a character is determined based on the size (width or height) of the set of black pixels and whether sets of black pixels having an approximately equal size exist closely to each other.

On the other hand, application of such a method for performing the region determination based on a binary image as disclosed in Japanese Patent Laid-Open No. 2002-077633 to an input image in which a character and a background are difficult to be separated by simple binarization may result in difficult identification of pixels included in the character. For example, when simple binarization is performed on a black character over a white background (character image having a larger density difference between the character and the background), the background pixels and the character pixels may be separated easily. On the other hand, when binarization is performed on a black character over a dark background (character image having a small density difference between a character and a background), the separation between the background pixels and the character pixels is difficult. Particularly, performing binarization on a character over a high-density background with a threshold value lower than the density of the background may result in a binary character image with characters degraded in black. In this case, when the size of the high-density background region is approximately equal to the size of the character, the binary image in which the background and the character are degraded in black as a result of the binarization may be wrongly determined as a character pixel part. For example, when a document in which a part of a character string is marked with a thick marker pen is scanned and the scanned image is binarized, the entire part marked with a marker pen may sometimes turn black. When the size of the part marked with a marker pen is close to the character size, the whole pixels of the part marked with the marker pen may have a state degraded in black as a result of binarization and may thus be handled as one character. In other words, all black pixels in a region degraded in black as a result of binarization may possibly be handled as pixels of a character.

SUMMARY OF THE INVENTION

According to an aspect of the present disclosure, an image processing apparatus includes a binarizing unit configured to generate a binary image by executing a binarization process on an input image, a first determining unit configured to determine a character region within the binary image, a character segmenting unit configured to acquire a region surrounding each character contained in the character region as character segmentation rectangle information, a thinning unit configured to acquire a thinned image by executing a thinning process on a region within the binary image, the region being identified based on the character segmentation rectangle information, an edge detecting unit configured to acquire an edge detected image by executing an edge detection process on the region identified based on the character segmentation rectangle information, a logical operation unit configured to take a logical AND of the thinned image and the edge detected image, and a second determining unit configured to determine whether each character identified based on the character segmentation rectangle information is a character to be separated from a background by the binarization process or not based on a result of the logical AND performed by the logical operation unit.

Further features of the present disclosure will become apparent from the following description of exemplary embodiments with reference to the attached drawings.

BRIEF DESCRIPTION OF THE DRAWINGS

FIG. 10 illustrates an example of an input image according to a second exemplary embodiment.

Figure 12:
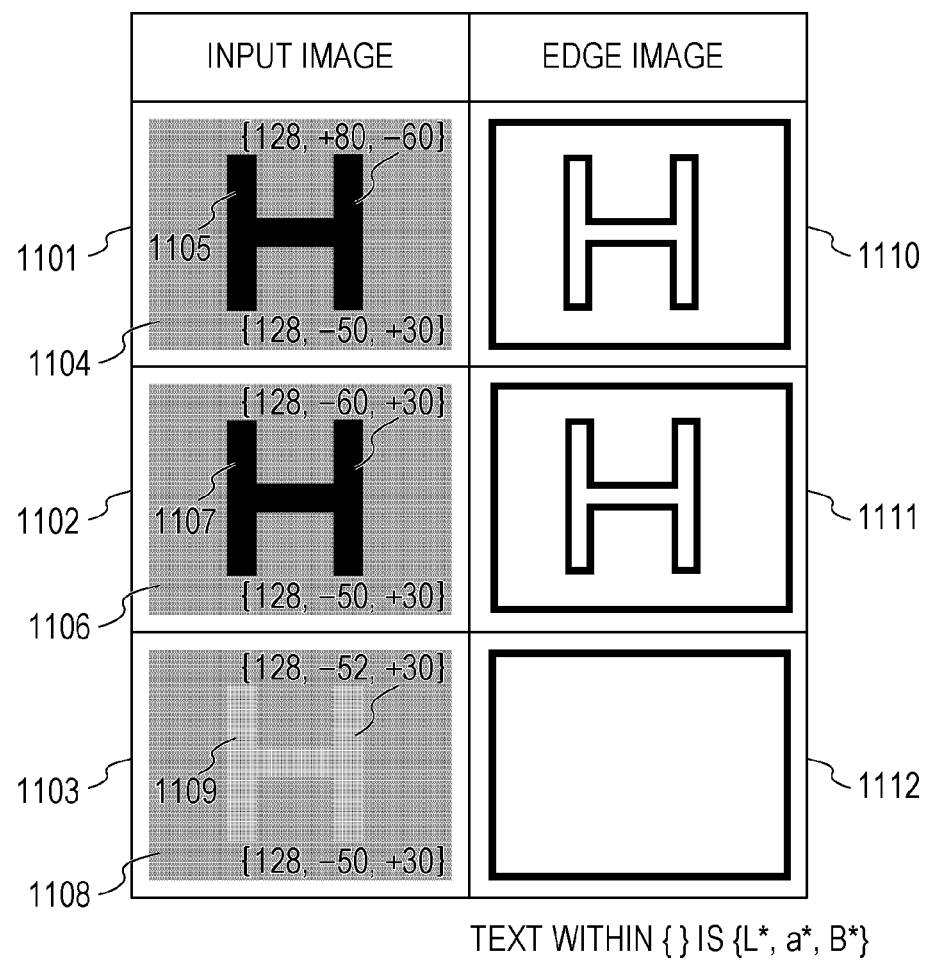

FIG. 12 illustrates samples for edge extraction.

DESCRIPTION OF THE EMBODIMENTS

Various exemplary embodiments, features, and aspects of the disclosure will be described in detail below with reference to the drawings.

First Exemplary Embodiment

Figure 1:
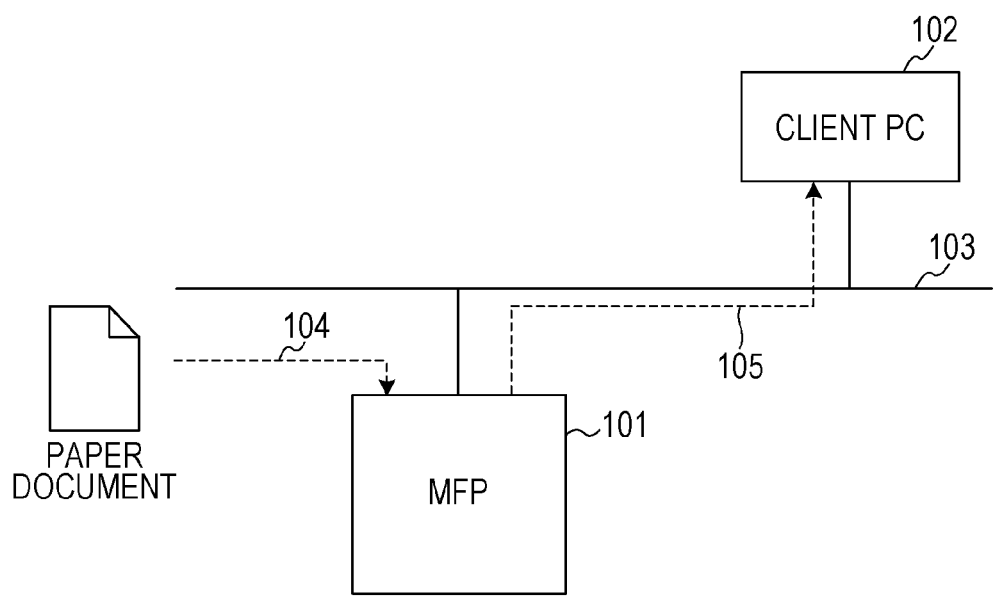
FIG. 1 is a block diagram illustrating an image processing system.

FIG. 1 is a schematic view illustrating a system configuration according to a first exemplary embodiment. Referring to FIG. 1, a multifunction peripheral (MFP) 101 and a computer (hereinafter, called a PC) 102 are connected over a network 103.

Broken lines 104 and 105 represent processing flows. The broken line 104 represents a processing flow to be performed by a user for reading a paper document by using a scanner of the MFP 101. In this case, the user is allowed to set a destination (such as the PC 102) to which a scanned image is to be transmitted and define settings regarding the scanning and transmission by using a user interface (203 in FIG. 2) of the MFP 101, which will be described below. As the settings, a user may designate a resolution, a compression rate, a data format (such as JPEG (Joint Photographic Experts Group), TIFF (Tag Image File Format), PDF (Portable Document Format), high compression PDF, and high compression PDF (with an OCR (Optical Character Recognition) result)). In this exemplary embodiment, it is assumed that high compression PDF (with an OCR result) is designated as a data format. The technical details of high compression PDF will be described below. The broken line 105 represents a processing flow for generating data by using a software or hardware function of the MFP 101 and transmitting the data to a designated destination based on the designated settings. Here, because an image having a file format such as PDF is transmitted to the PC 102, it may be viewed on a general viewer in the PC 102.

Figure 2:
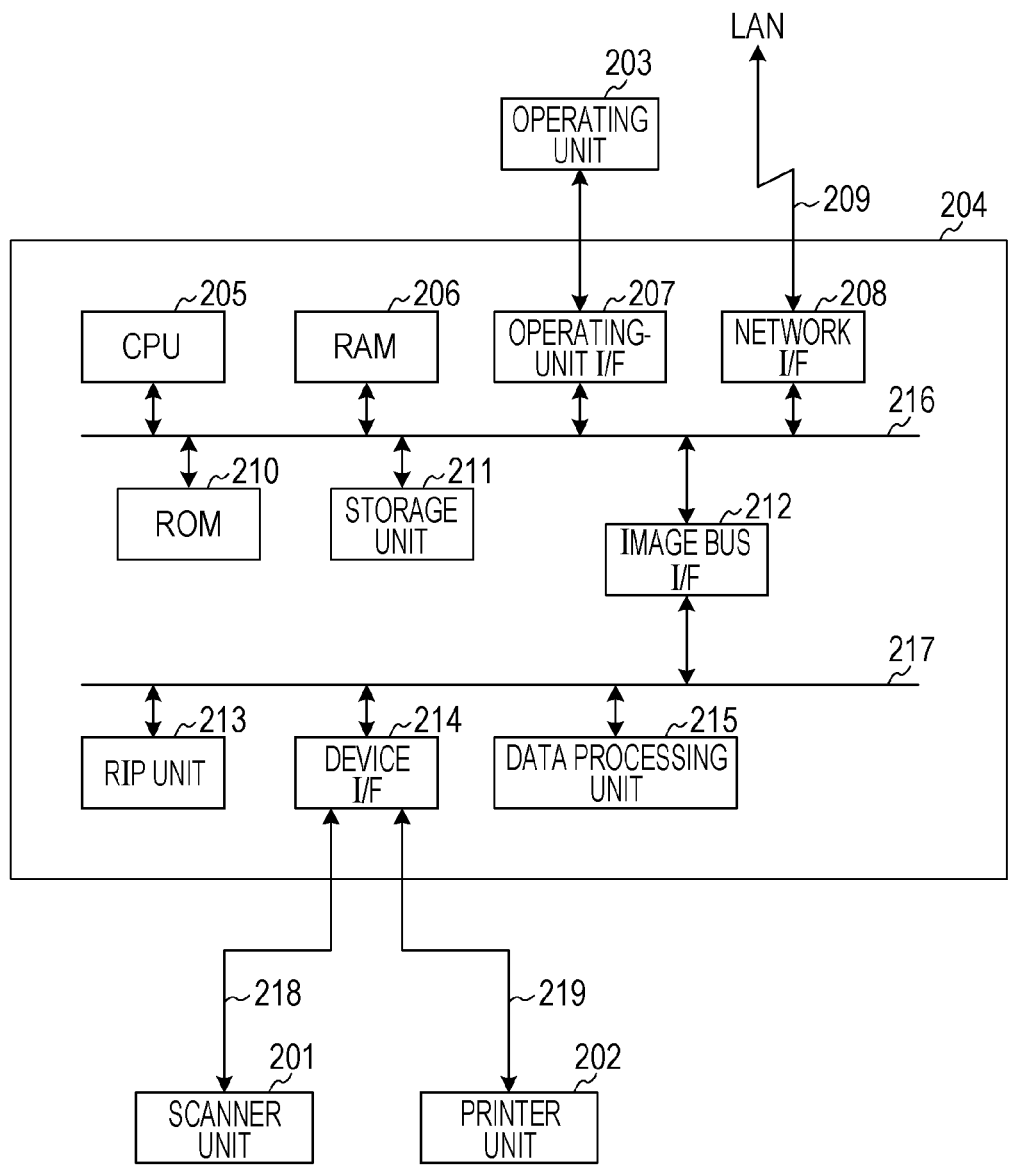
FIG. 2 illustrates a hardware configuration of a multifunction peripheral (MFP) according to a first exemplary embodiment.

FIG. 2 illustrates a detail configuration of the MFP 101. The MFP 101 includes a scanner unit 201 that is an image input device, a printer unit 202 that is an image output device, a control unit 204 configured to generally control the MFP, and an operating unit 203 that is a user interface. The control unit 204 is a controller connecting to the scanner unit 201, printer unit 202, and operating unit 203 and connecting to a local area network (LAN) 209 on the other hand for input/output of image information and device information. A central processing unit (CPU) 205 is a processor configured to control the entire system. A read-only memory (RAM) 206 is a system work memory usable by the CPU 205 for operations and also functions as an image memory for temporarily storing image data. A random access memory (ROM) 210 is a boot ROM and stores programs such as a system boot program. A storage unit 211 is a non-volatile storage medium such as a hard disk drive and stores system control software and image data. As used herein, the term "unit" generally refers to any combination of software, firmware, hardware or other component, such as circuitry, that is used to effectuate a purpose.

An operating unit I/F 207 is an interface unit to the operating unit (UI) 203 and is used to output image data to be displayed on the operating unit 203 to the operating unit 203. The operating unit I/F 207 serves to inform the CPU 205 of information instructed by a user of the image processing apparatus through the operating unit 203. A network I/F 208 connects the image processing apparatus to the LAN 209 for data input/output (for example, for transmitting a PDF compressed data to another apparatus and receiving PDF compressed data from another apparatus). These units are provided on a system bus 216. An image bus interface 212 connects the system bus 216 and an image bus 217 is a bus bridge configured to transfer image data at a high speed and convert a data structure. The image bus 217 may be a peripheral component interconnect (PCI) bus, IEEE1394, or the like. The units described above are provided on the image bus 217. A raster Image processor (RIP) 213 performs what-is-called rendering processing including analyzing a PDL (page description language) code and decompressing it to a bitmap image having a designated resolution. A device interface (I/F) unit 214 connects the scanner unit 201 being an image input device through a signal line 218 and connects the printer unit 202 being an image output device through a signal line 219 and performs synchronization-based/asynchronization-based conversion on image data. A data processing unit 215 generates PDF compressed data (515) by performing high compression PDF and OCR processing. The generated compressed data (515) is transmitted to a destination (such as the client PC 102) through the network I/F 208 and over the LAN 209. The data processing unit 215 is capable of decompressing compressed data received through the network I/F 208 and over the LAN 209. The decompressed image is transmitted to the printer unit 202 through the device I/F 214 and may be printed.

Description of Data Processing Unit 215

Next, a configuration of the image compressing processing unit implemented by the data processing unit 215 in FIG. 2 and a configuration of the image decompression processing unit will be described with reference to the block diagrams in FIGS. 5 and 6. The data processing unit 215 may be configured such that a processor may execute a computer program to cause the data processing unit 215 to function as corresponding one of the processing units in FIGS. 5 and 6, or a part or all of the processing units may be configured by hardware such as an ASIC (Application-Specific Integrated Circuit) and an electronic circuit.

A high compression PDF process, as described in Japanese Patent Laid-Open No. 2002-077633, determines the type of a given region for each attribute and compresses the data by adaptively selecting binary reversible compression with MMR (Modified Modified Read) and multi-valued non-reversible compression with JPEG in accordance with the attribute of the region. In other words, MMR compression may be performed on a character region, and JPEG compression may be performed on an image having its character region filled with a surrounding color for a greater compression rate and higher quality of the character region. The high compression PDF processing is an effective compression technology for color or black-and-white multi-valued images. According to this exemplary embodiment, whether a region which may be degraded as a result of binarization is a character region or not may be determined, the details of which will be described below. This allows determination of an actual character region only as a subject of MMR compression.

Figure 5:
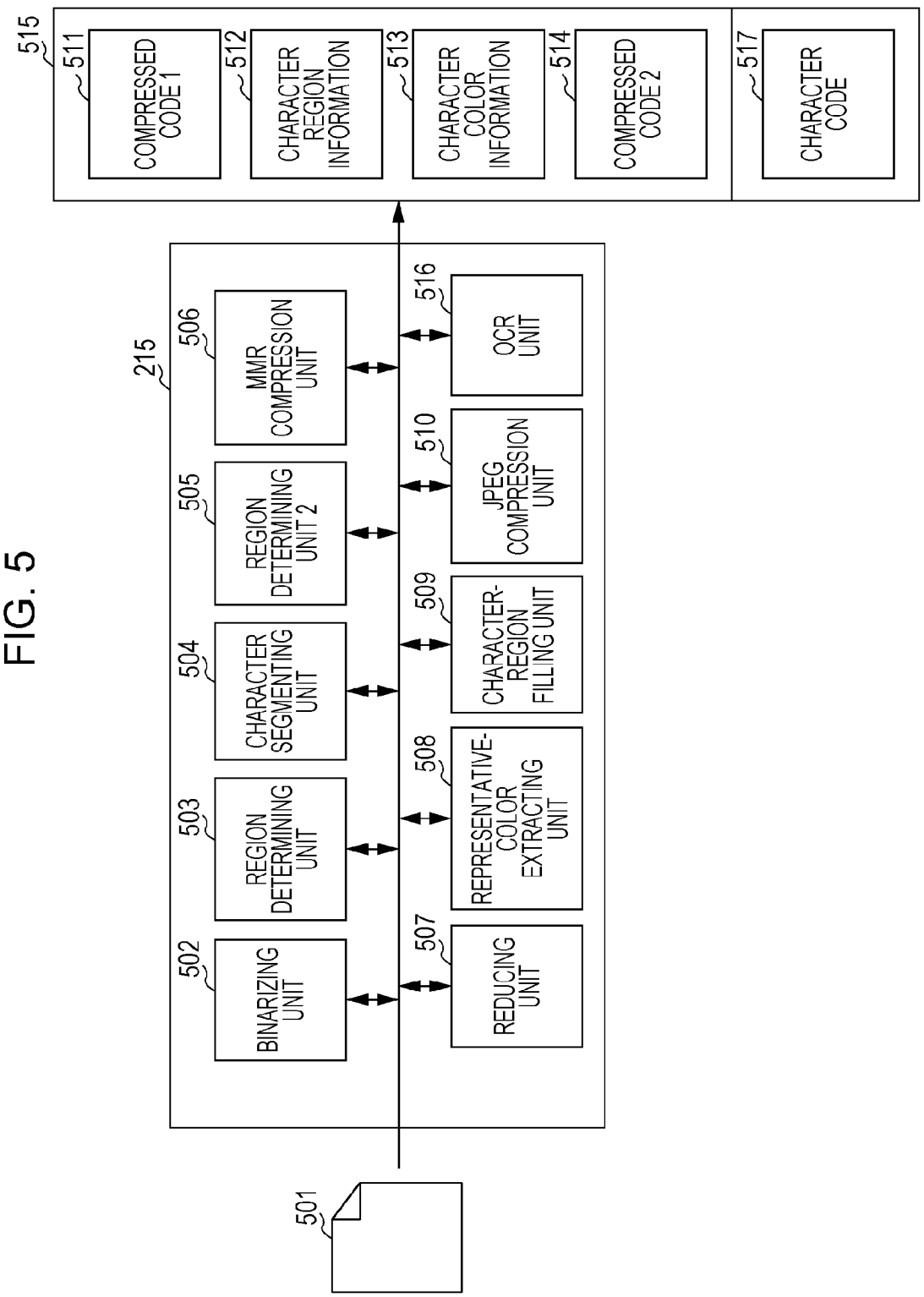
FIG. 5 is a block diagram of an image compressing processing unit.

FIG. 5 is a block diagram illustrating a configuration of the image compressing processing unit implemented by the data processing unit 215 and illustrating processing units for compressing an input image to generate a high compression PDF (with an OCR result).

A binarizing unit 502 generates a binary image from an input image 501 that is a multi-valued image. In the binary image, a pixel having a density greater than a threshold value in an input image may be a black pixel, for example, while a pixel having an equal or lower density than the threshold value may be a white pixel, for example. (Apparently, such a binarization result may not be represented in black and white but may be represented in other colors or may be represented by 1, 0 or 0, 1 without color). The binarizing unit 502 performs its processing for the purpose of distinguishing a pixel having a density greater than a threshold value and a pixel having an equal or lower than the threshold value. Other processes than binarization may be applied as far as the same purpose may be achieved (such as ternarization and quaternarization). However, the following description assumes that binarization is performed by the binarizing unit 502. Binarization on an input image 701 may result in a binary image 702. When the input image is a polychrome multi-valued image, the binarization is only performed on a luminance (such as Y of YUV) of the multi-valued image.

A region determining unit 503 detects a character region and a picture image region from a binary image generated by the binarizing unit 502. Thus, character regions 704 and 706 and a picture image region 705 are detected, for example. This processing is performed based on a publicly known region determination method (such as Japanese Patent Laid-Open No. 06-068301). The processing may be summarized as follows, for example.

(1) An outline of 8-connected black pixels is traced on the binary image 702 to extract a black pixel cluster (black cluster of pixels) that is continuously present in any direction of in 8 directions. The expression "8-connected" refers to continuous presence of pixels having a same color (black in this case) in one of eight directions of upper left, left, lower left, lower, lower right, right, upper right, and upper directions. On the other hand, the expression "4-connected" refers to continuous presence of pixels having a same color in any of four directions of left, lower, right, and upper directions.

(2) If there is a black cluster of pixels larger than a predetermined size (such as a black cluster of pixels surrounding a region larger than a predetermined dimension) among the extracted black clusters of pixels, whether any white cluster of pixels exists within the region or not is determined. In other words, a white cluster of pixels is extracted by tracing an outline of 4-connected white pixels within the region. If the extracted white cluster of pixels is larger than a predetermined size, the outline of the black pixel is traced again similarly to extract a black cluster of pixels. These steps are repeated until the cluster of pixels has a size equal to or smaller than the predetermined size.

(3) The acquired black cluster of pixels is classified into a character or a picture based on at least one of its size, shape, and black pixel density. For example, a black cluster of pixels having an aspect ratio close to 1 (or fits into 1 plus or minus $\alpha$ where $\alpha$ is a fixed threshold value such as 0.1) and having a size within a predetermined range (for example, the number of pixels surrounded by the black cluster of pixels is equal to or lower than 100 pixels) is determined as a black cluster of pixels including a character. The other black clusters of pixels are determined as clusters of pixels included in a picture.

(4) The distance between black clusters of pixels included in one character is equal to or shorter than a predetermined distance (such as 3 pixels), the black clusters of pixels are classified into one group. A bounding rectangle region including both of the black clusters of pixels classified into one group is determined as a character region (704, 706). It should be noted that a black cluster of pixels included in a character with no other black cluster of pixels included in the character exists within a predetermined distance, the black cluster of pixels may form one group singly. Therefore, the bounding rectangle region of the single black cluster of pixels is determined as a character region. The same processing as the processing described in (4) is performed on black clusters of pixels included in a picture.

(5) Locations of the regions and attribute identification information (character or picture) of the regions are output as determination results.

The processing in (1) to (5) outputs a determination result that the regions 704 and 706 are character regions and the region 705 is a picture image region. The region determining unit 503 has been described up to this point.

Figure 7:
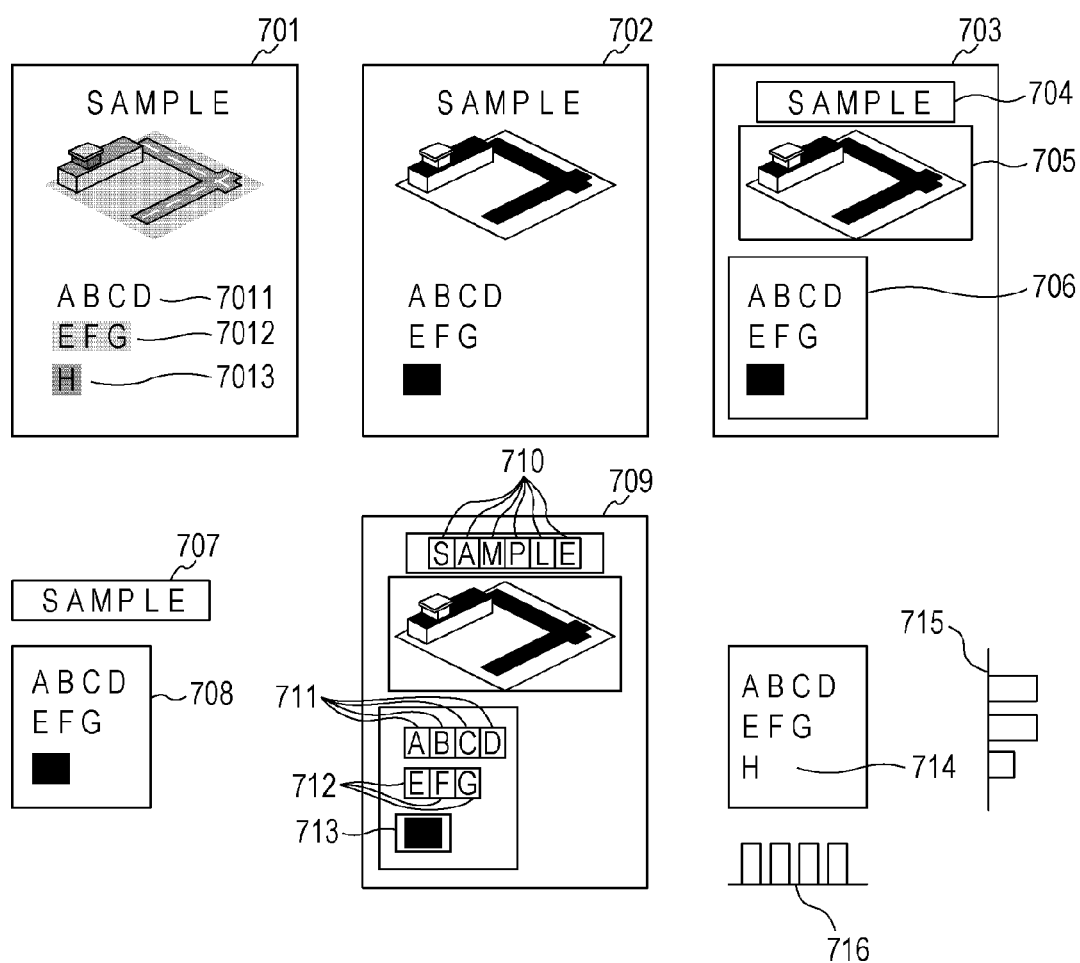
FIG. 7 illustrates input image samples and output image samples.

A character segmenting unit 504 performs a segmentation process with a character segmentation rectangle on the character regions generated by the region determining unit 503. FIG. 7 illustrates segmentation results 710, 711, 712, and 713. The segmentation process includes the following steps.

(1) One of the character regions is selected (708 is selected, for example).

(2) A projection in a horizontal direction is taken for one binary image identified based on the character region. More specifically, the number of black pixels on a horizontally extending line is counted, and the resulting counted number corresponds to its projection. FIG. 7 illustrates a taken projection 715. In the projection 715, a series of lines in the vertical direction having more black pixels than a threshold value is handled as one group. As the result, three groups occur. The three groups include a group of lines having ABCD, a group of lines having EFG, and a group of lines having H.

(3) A projection in the vertical direction is taken for the groups. FIG. 7 illustrates the projection 716 taken for the lines having ABCD.

(4) In the projections for the groups, a series of lines in the horizontal direction having more black pixels than a threshold value is handled as one group. For example, in the projection 716, four groups occur. The four groups include a group of lines having A, a group of lines having B, a group of lines having C, a group of lines having D.

(5) The bounding rectangles of the groups of lines acquired in (4) are segmented as character segmentation rectangles. As a result, for example, a bounding rectangle of each character is segmented as a character segmentation rectangle. FIG. 7 illustrates results 711, 712, 713, and 710 of the segmentation.

(6) The processing in (1) to (5) is repeated until no more unselected character region exists.

FIG. 7 illustrates images to be processed and image examples of results of the binarization, region determination, and character segmentation processes. FIG. 7 illustrates an image 701 that is an example of the input image 501 and further illustrates a character image 7011 on a white background, a character image 7012 on a background having a lower density, and a character image 7013 on a higher density background. In other words, the character images 7011 and 7012 are character images having a greater density difference between their characters and backgrounds, and the character image 7013 is a character image having a smaller density difference between its character and background.

FIG. 7 further illustrates an example binary image 702 of a result of binarization performed on the image 701 in the binarizing unit 502 and further exemplarily illustrates a character 7013 is degraded in black as a result of a binarization process with a lower threshold value than the density of the background.

In description of this exemplary embodiment, a character image degraded as a result of a binarization process (an image in which a background and a character are difficult to separate even by performing a binarization process thereon because the density difference between the background and the character is small, such as a character density on a background greater than a threshold value) will be called a "character image difficult to be separated from the background". A character image not degraded as a result of a binarization process (an image in which a background and a character are easy to separate by performing a binarization process thereon because the density difference between the background and the character is large, such as a black character on a white or lower background than a threshold value) will be called a "character image difficult to be separated from the background". In other words, the "character image easy to be separated from the background" is an image of a character region having a character image part being black pixels and a background part, excluding the character, being white pixels as a result of a binarization process.

The image 703 is a result of a region determination process performed on the binary image 702 in the region determining unit 503. As a result of the region determination process, the regions 704 and 706 are determined as character regions, and the region 705 is determined as a picture image region. The character regions 707 and 708 are partial images extracted from the binary image 703 and determined as character regions by the region determining unit 503. A schematically illustrated character segmentation rectangle 709 is a result of a segmentation process performed by the character segmenting unit 504. A character segmentation rectangle 710 is segmented from inside of the character region 704. Character segmentation rectangles 711, 712, and 713 are segmented from inside of the character region 706.

A region determining unit 2 (505) determines whether the character image within the character segmentation rectangle segmented by the character segmenting unit 504 is a character degraded by a binarization process (character image difficult to be separated from the background) or not. Details of the determination to be performed by the region determining unit 2 will be described below. Based on information on the character region determined as a "character image difficult to be separated from the background" by the region determining unit 2 (505), the character region information generated by the region determining unit 503 and the character segmentation rectangle information generated by the character segmenting unit 504 are modified. In other words, information on the character region determined as a "character image difficult to be separated from the background" by the region determining unit 2 (505) is removed from the character region information generated by the region determining unit 503 and the character segmentation rectangle information generated by the character segmenting unit 504. This may solve a problem that the character region determined as a "character image difficult to be separated from the background" is not determined as a character and does not undergo MMR compression, which will be described below, resulting in invisibility of the character image.

An MMR compression unit 506 extracts a binary image of the character region based on the character region information modified by the region determining unit 2 (505) from the binary image generated by the binarizing unit 502 (or extracts a binary image included in the character segmentation rectangular region determined as a "character image easy to be separated from the background"). Then, the MMR compression unit 506 performs MMR compression on the binary image of the extracted character region to generate a compression code 1 (511).

A reducing unit 507 performs a reduction process (resolution reduction process) on an input image 501 to generate a reduced multi-valued image (not illustrated).

A representative-color extracting unit 508 identifies a location of pixels (black pixels) forming characters in the binary image based on the character region information and character segmentation rectangle information modified by the region determining unit 2 (505). A representative color of characters is calculated for each character segmentation rectangular region based on the identified location of pixels of the characters and with reference to the color of the corresponding location in the reduced multi-valued image so that character color information 513 of each of the characters is acquired. For example, a representative color may be an average or a weighted average of colors in a multi-valued image of pixels that have turned to black in the binary image in the character segmentation rectangular region or a most frequently occurring color among the pixels. Various methods for acquiring a representative color may be possible, but a color in a multi-valued image of at least one pixel of pixels having turned to black in a binary image in a character segmentation rectangular region is used for the calculation of a representative color.

A character-region filling unit 509 identifies a location of pixels (black pixels) included in characters in a binary image based on the character region information and character segmentation rectangle information modified in the region determining unit 2 (505). Then, based on the identified location of pixels, the pixels in the corresponding location in a reduced multi-valued image is filled with color surrounding it (hereinafter, called a surrounding color). The surrounding color may be an average value of pixel values of pixels surrounding a character, and the pixel value of pixels is replaced by the acquired surrounding color. Details of such a fill-up process performed by the character-region filling unit are disclosed in Japanese Patent Laid-Open No. 06-068301.

A JPEG compression unit 510 performs JPEG compression on an image having undergone the fill-up processing performed by the character-region filling unit 509 to generate a compression code 2 (514).

An OCR unit (516) performs publicly known character recognition processing with reference to the character segmentation rectangle information generated in step 904 for the region determined as a character region by the region determining unit (503). A character code 517 is a character code acquired by the character recognition processing.

Here, while the MMR compression unit (506) performs MMR compression on a region, determined as a character or a region determined as a "character image easy to be separated from the background" by the region determining unit 2 (505), the OCR unit (516) performs OCR on a region determined as a character region by the region determining unit (503).

Among such regions, because a "character image easy to be separated from the background" corresponds to a partial region of a region determined as a character region by the region determining unit (503), the region of a "character image easy to be separated from the background" is narrower. In other words, a target region subject to OCR is wider while a target region subject to MMR compression is narrower.

A reason why a target region subject to OCR is wider is that even when a target region subject to OCR contains a region that does not actually correspond to a character, an unnecessary character code may only be acquired, which is not a significant problem (or such a unnecessary character code may be deleted if it is considered so). On the other hand, performing MMR compression on a region that does not actually correspond to a character may cause deterioration in image quality in the region. For that reason, a wider region is subject to OCR while a narrower region is subject to MMR compression.

Thus, compressed data a file in PDF format (515) is generated which contains the compression code 1 (511) acquired from a component, modified character region information (512), character color information (513), compression code 2 (514), and character code (517). The generated file in PDF format is transmitted to a destination designated by a user, as described above.

Figure 6:
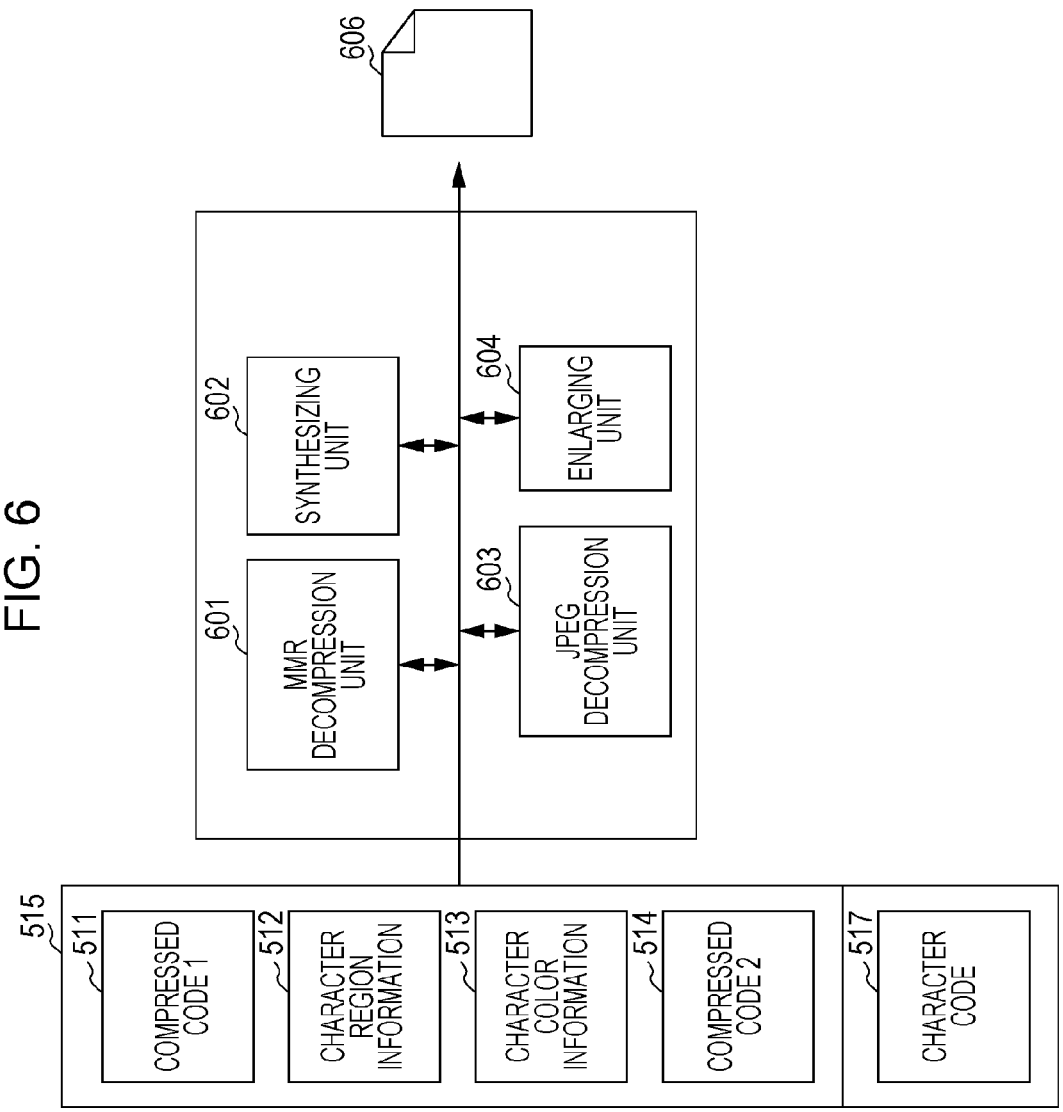
FIG. 6 is a block diagram of an image decompression processing unit.

FIG. 6 is a block diagram illustrating a configuration of an image decompression processing unit configured to decompress PDF compressed data transmitted from another apparatus. The processing illustrated in FIG. 6 may be executed for decompressing and printing a compressed data, for example. Here, an example will be described in which compressed data transmitted from another apparatus is identical to the compressed data file 515.

An MMR decompression unit 601 performs MMR decompression processing on the compression code 1 (511) contained in the compressed data (515) file to reproduce a binary image. A JPEG decompression unit 603 performs JPEG decompression processing on the compression code 2 (514) to reproduce a reduced multi-valued image. An enlarging unit 604 performs enlarging processing on the reduced multi-valued image decompressed by the JPEG decompression unit (603) to generate a multi-valued image having an equal size to the size of the input image 501 before it is compressed.

A synthesizing unit 602 allocates, with reference to the character region information (512), a color corresponding to character color information (hereinafter, called a character color) (513) to black pixels in the binary image decompressed by the MMR decompression unit. The binary image to which the character color is allocated is synthesized over the multi-valued image generated by the enlarging unit 604 to generate a decompressed image 605. For this synthesis, a transparent color is allocated to white pixels in the binary image so that the background multi-valued image may be transparent. In this manner, the image decompression processing unit decompresses compressed data generated by the image compressing processing unit to generate the decompressed image 605. The decompressed image 605 is transmitted to and is printed by the printer unit 202 through the device I/F 214. It should be noted that the image decompression processing unit ignores the character code 517. This is because a character code is not necessary for printing decompressed image. A character code is necessary for not the MFP 101 but an apparatus such as the client PC 102 which displays the decompressed image 605 on a display device. Therefore, the MFP 101 ignores the character code 517. More accurately speaking, a character code is necessary for a user who is using the PC 102 rather than the PC 102 itself. A character code is used for cutting and paste and editing a character string.

Next, details of processing to be executed by the region determining unit 2 (505) will be described. The region determining unit 2 (505) determines whether a character image within a character segmentation rectangle is degraded by binarization based on an binary image generated by the binarizing unit 502, a reduced multi-valued image generated by the reducing unit 507 and character segmentation rectangle information generated by the character segmenting unit 504. It should be noted that the input image 501 may be used instead on the reduced multi-valued image if the input image 501 is held in the storage unit 211.

Figure 3:
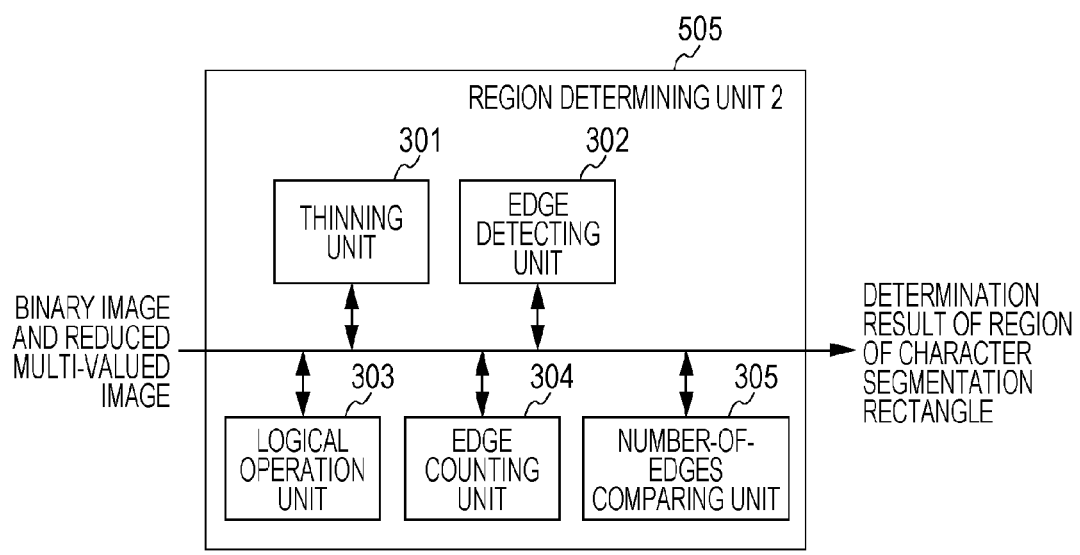
FIG. 3 is a block diagram of a region determining unit according to the first exemplary embodiment.
Figure 4:
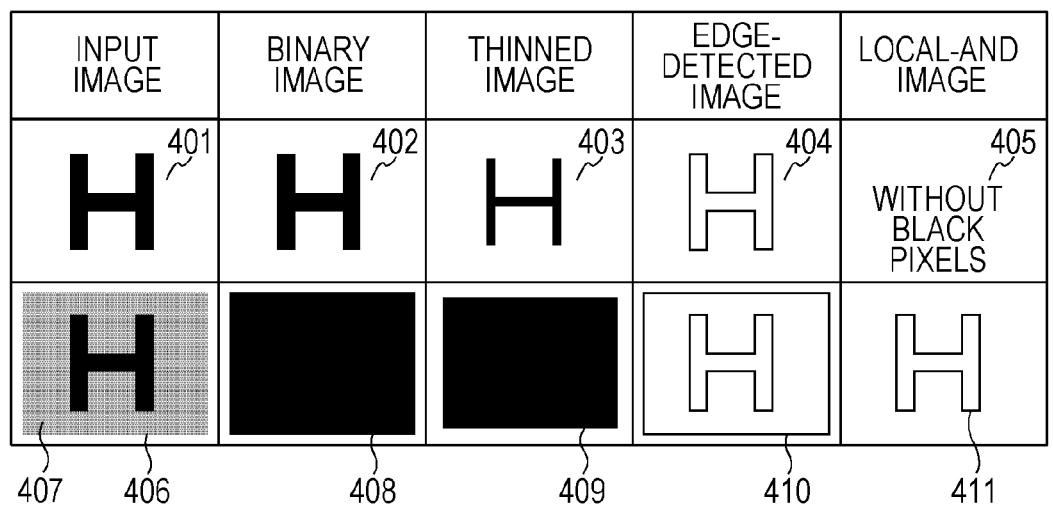
FIG. 4 is a diagram for explaining a region determination according to the first exemplary embodiment.
Figure 4:
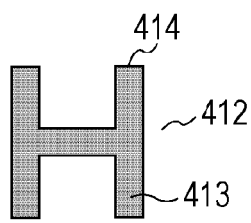

A detail configuration of the region determining unit 2 (505) will be described with reference to FIG. 3. For easy understanding of the following description, character image examples in FIG. 4 will also be referred. FIG. 4 illustrates a character image 401 having a character on a white background (with a large density difference between the background and the character). When the binarizing unit 502 binarizes the image 401, a binary image 402 is acquired. A character image 406 has a character on a dark background (with a small density difference between the background and the character). When the image 406 is binarized with a lower threshold value than the density of the background 407, a black degraded image 408 is acquired. Because a similar image to the image 402 is acquired by binarizing a character on a background having a light density with a threshold value between the density of the background and the density of the character, the description will be omitted. Images 403 to 405 and 409 to 411 will be described below.

The region determining unit 2 (505) includes a thinning unit 301, an edge detecting unit 302, a logical operation unit 303, an edge counting unit 304, and a number-of-edges comparing unit 305.

The region determining unit 2 (505) extracts internal edge pixels of a region having a density greater than a threshold value (or black regions in images 402 and 408) (1). If the number of extracted edge pixels is lower than a threshold value, it is determined as a "character image easy to be separated from the background" (2). If the number of extracted edge pixels is equal to or greater than the threshold value, it is determined as a "character image difficult to be separated from the background" (2).

For example, no edge pixels exist within the black region in the image 402. On the other hand, there are edge pixels (edge pixels of the character "H" in the image 410) within the black region in the image 408. The term "edge pixel" refers to an edge pixel extracted from a multi-valued image (input image) rather than an edge pixel extracted from a binary image.

One configuration will be described below for implementing the steps (1) and (2) though an embodiment of the present disclosure is not limited to the configuration. Other possible configurations will also be described below.

The thinning unit 301 executes thinning process on a binary image in character segmentation rectangles with reference to character segmentation rectangle information. The thinning process thins a black cluster of pixels by trimming outer 2 pixels of a black cluster of pixels within a binary image (or replacing a black pixel on an outline of a black cluster of pixels by a white pixel). For example, pixels within a binary image contained in a one target character segmentation rectangle may sequentially be handled as a pixel of interest to be scanned by utilize a 5×5 window. If at least one white pixel exists within the 5×5 window, the pixel of interest (at the center of the 5×5 window) may be replaced by a white pixel for implementing the thinning process. Here, performing the thinning process on the binary image 402 may result in a thinned image 403, for example. Performing the thinning process on the binary image 408 may result in a thinned image 409, for example.

The edge detecting unit 302 performs edge detection on an input reduced multi-valued image in character segmentation rectangles with reference to character segmentation rectangle information. An image in which a pixel determined as an edge is represented by a black pixel and a pixel not determined as an edge is represented by a white pixel will be called an edge detected image. Because the edge detection may be based on a publicly known method, the following processing may be possible though description on details will be omitted. For example, differential filtering is executed on a luminance component of a reduced multi-valued image to acquire edge intensities of pixels. A pixel having an edge intensity equal to or greater than a predetermined threshold value is represented by a black pixel, and a pixel having an edge intensity lower than the predetermined threshold value is represented by a white pixel so that an edge detected image may be generated. However, an edge detection method according to a fourth exemplary embodiment, which will be described below, may be used for achieving edge detection with high precision.

Performing an edge detection process on a reduced multi-valued image, not illustrated, acquired by reducing the input image 401 may result in an edge detected image 404. Performing the edge detection process on a reduced multi-valued image, not illustrated, acquired by reducing the input image 406 may result in an edge detected image 410. If a reduced multi-valued image, not illustrated, acquired by reducing the input image 401 or 406 has ½ of the resolutions of an input image, the images 404 or 410 may have ½ of resolutions of the corresponding input image. However, those images are illustrated as having equal sizes for simplification. When the storage unit 211 holds the input image 401 or 406, the edge detection may be performed on the input image 401 or 406 instead on a reduced multi-valued image.

The logical operation unit 303 is configured to take a logical AND of a thinned image generated by the thinning unit 301 and an edge detected image generated by the edge detecting unit 302 to generate a logical AND image. More specifically, only when a thinned image generated by the thinning unit 301 contains a black pixel and a black pixel exists at the corresponding location in the edge detected image generated by the edge detecting unit 302, taking a logical AND of them results in a black pixel. When an edge detected image generated by the edge detecting unit 302 has ½ of resolutions of the thinned image, 0-order interpolation may be performed on the edge detected image to have equal resolutions as those of the thinned image before a logical AND is taken. Alternatively, a thinned image may be thinned out to have equal resolutions to those of the edge detected image before a logical AND is taken. Taking a logical AND of the thinned image 403 and the edge detected image 404, a black pixel does not exist within a logical AND image 405 fundamentally (though some black pixels may remain due to an influence of noise) because a black pixel in the thinned image 403 and a black pixel in the edge detected image 404 do not exist at an identical location. On the other hand, taking a logical AND of the thinned image 409 and the edge detected image 410, a black pixel remains in a part corresponding to a character as in a logical AND image 411. From this, there is a characteristic that a fewer black pixels exist within a logical AND image for a character image easy to be separated from the background" while more black pixels exist within a logical AND image for a "character image difficult to be separated from the background".

An image 412 is acquired by overlaying the thinned image 403 and the edge detected image 404 with each other. The image 412 has black pixels 413 corresponding to the thinned image 403 and has black pixels 414 corresponding to the edge detected image 404. Because the black pixels in the thinned image 413 and the black pixels in the edge detected image 414 do not exist at an identical location, taking a logical AND of them does not generate black pixels.

The edge counting unit 304 is configured to count, as a number of edges, the number of black pixels in a result (logical AND image) of a logical AND taken by the logical operation unit 303.

The number-of-edges comparing unit 305 is configured to compare the number of edges in a given image counted by the edge counting unit 304 and a predetermined threshold value to determine whether the image is a "character image easy to be separated from the background" or a "character image difficult to be separated from the background". In other words, if the counted number of edges is lower than the predetermined threshold value, the image is determined as a "character image easy to be separated from the background (character image not degraded by binarization)". If the counted number of edges is equal to or greater than the predetermined threshold value, the image is determined as a "character image difficult to be separated from the background (character image degraded by binarization)".

If the pixel width of a black cluster of pixels is smaller than a thinning width of a thinning process, performing the thinning process may result in no black cluster of pixels within the binary image. For example, when a black cluster of pixels in a binary image is a thin line character having a 3-pixel width and a thinning process with a 4-pixel thinning width is performed thereon, no black cluster of pixels remains. In a case where no black cluster of pixels remains as a result, the processing to be performed by the edge detecting unit 302, logical operation unit 303, edge counting unit 304 and number-of-edges comparing unit 305 may be omitted from viewpoint of the improvement of processing speed. This is because counting the number of edges in a logical AND image with a thinned image apparently results in 0 even when if edge detecting unit 302 detects edge pixels. Because the counting result 0 means that the number of edges is lower than the predetermined threshold value, the image may be determined as a "character image easy to be separated from the background (character image not degraded by binarization)".

Therefore, in a case where all of black pixels in a subject character segmentation rectangle disappear due to a thinning process performed thereon, the image in the character segmentation rectangle is determined as a "character image easy to be separated from the background (character image not degraded by binarization)" without performing the processing in the edge detecting unit 302 to the number-of-edges comparing unit 305. When the processing to be performed by the units 302 to 305 is omitted, the processing in the thinning unit 301 to the number-of-edges comparing unit 305 is performed on a next character segmentation rectangular region. The reason for omitting the processing may be explained as follows. That is, such disappearance of black pixels due to a thinning process performed thereon may indicate that width of such black pixels is thin and the black pixels generally corresponds to a character or a line though a width of black pixels in a binary image is significantly narrow. Therefore, it may be explained that a target character segmentation rectangular region may be determined as a "character image easy to be separated from the background (character image not degraded by binarization)" without performing the processing from viewpoint of processing speed.

Alternatively, in a case where all black pixels within a binary image disappear, the number of pixels to be trimmed may be reduced. For example, replacing a pixel of interest (center of a 5×5 window) by a white pixel because one white pixel exists within a 5×5 window may result in replacement of all black clusters of pixels by white pixels. To avoid this, the window size may be reduced for processing with a 3×3 window.

Having described that the number of edges counted by the edge counting unit 304 is compared with a predetermined threshold value, a value acquired by dividing the number of edges by the number of black pixels in a thinned image may be compared with a predetermined threshold value. This may allow appropriate determination independent of the size of the character segmentation rectangular region. The number of edges may be divided by number of all pixels included in the character segmentation rectangular region or the number of black pixels after the rectangular region is binarized. However, for the highest precision, the number of edges may be divided by the number of black pixels in a thinned image. From this, the proportion of edges present in an internal part of the binary image (internal part within a dark region) may be learned. A greater proportion thereof means that there is a high proportion of edges in the inner part of the binary image and therefore that there is a high possibility that the binary image is not a character.

Figure 8:
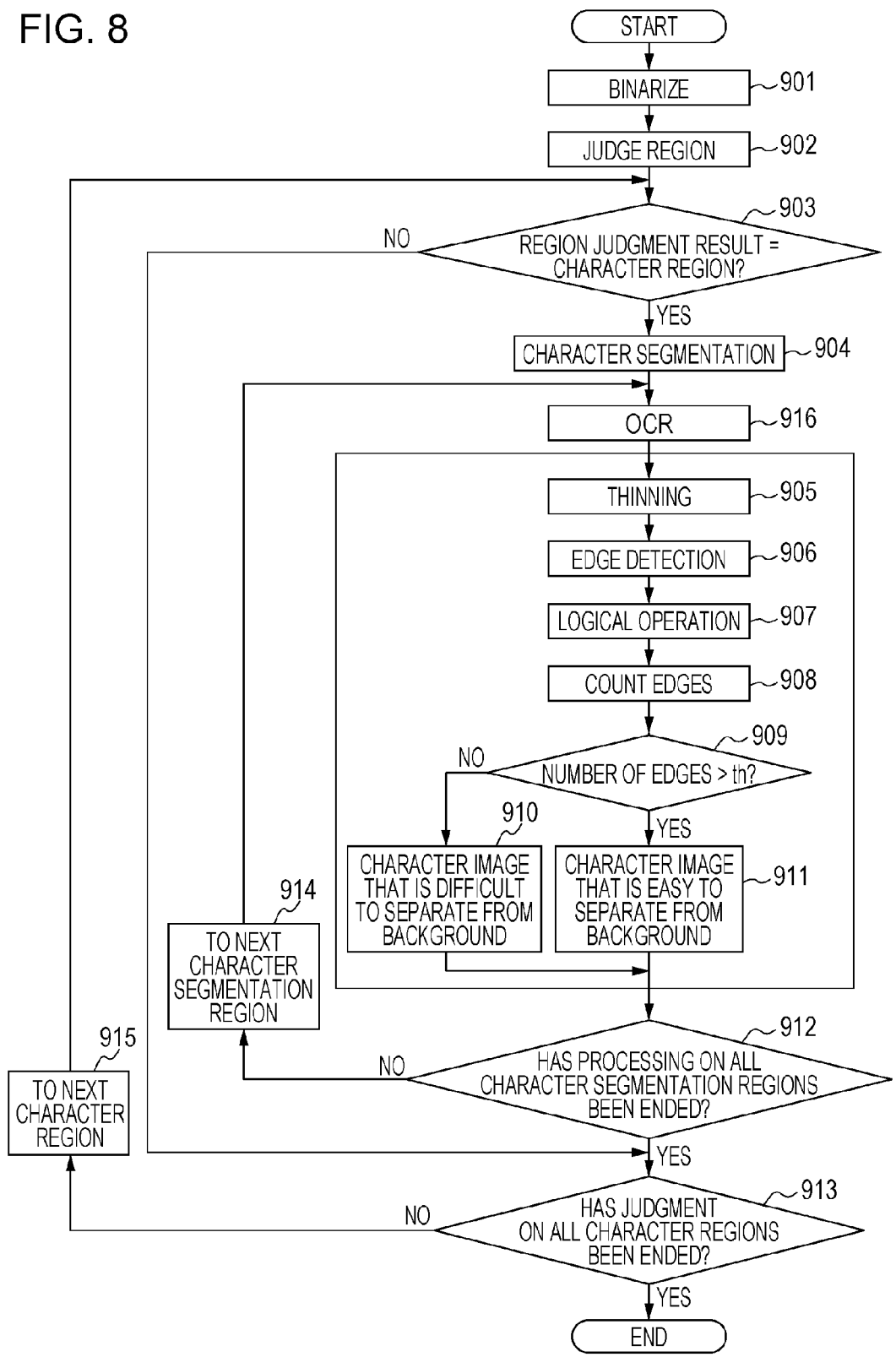
FIG. 8 is a flowchart for region determination according to the first exemplary embodiment.

Next, steps to be executed by the data processing unit 215 will be described with reference to the flowchart in FIG. 8. FIGS. 2, 3, and 5 are further referred in the following description. The region determining unit 2 (505) executes steps 905 to 911 in FIG. 8.

In step 901, the binarizing unit 502 executes the binarization process on the input image 501.

In step 902, the region determining unit 503 executes the region determination process on the binary image and identifies regions contained in the binary image and determines whether each of the identified regions is a character region or non-character region.

In step 903, the regions having undergone region determination by the region determining unit 503 are handled sequentially one by one as a region of interest. If the region of interest is a region determined as a character region by the determining unit, the processing moves to step 904. If it is a region determined as a non-character region, the processing moves to step 913.

In step 904, the character segmenting unit 504 performs character segmentation on an image within the region of interest to generate character segmentation rectangle information.

In step 916, the OCR unit 516 performs a publicly known character recognition process on a region determined as a character region by the region determining unit (503) referring to the character segmentation rectangle information generated in step 904.

In step 905, the thinning unit 301 executes a thinning process on each binary image resulting from the binarization in step 902 within the character segmentation rectangle referring to the character segmentation rectangle information generated in step 904.

In step 906, the edge detecting unit 302 executes an edge detection process on each reduced multi-valued image within the character segmentation rectangle (or an input image within the character segmentation rectangle) by using the reduced multi-valued image resulting from the reduction of an input image (or the input image 501) and character segmentation rectangle information generated in step 904.

In step 907, the logical operation unit 303 takes a logical AND of the thinned image generated by the thinning unit 301 in step 905 and the edge image generated in step 906.

In step 908, the edge counting unit 304 counts black pixels in an image resulting from the logical AND (AND) performed by the logical operation unit 303 in step 907 to acquire the number of edges. Here, the acquired number of edges may be divided by an area of the character segmentation rectangular region (the total number of pixels within the character segmentation rectangular region) to be normalized for acquiring the number of edges per a unit area. This advantageously allows comparison with a threshold value in step 909 independently from the size of the character segmentation rectangular region.

Next, in step 909, the number-of-edges comparing unit 305 compares the number of edges counted in step 908 and a threshold value th. Here, if the number of edges is greater than the threshold value th, the character segmentation rectangular region of interest is determined as a "character image difficult to be separated from the background" in step 910. If the number of edges is equal to or lower than the threshold value th, the character segmentation rectangular region of interest is determined as a "character image easy to be separated from the background" in step 911.

In step 912, the character segmenting unit 504 determines whether all character segmentation rectangles within the character region of interest have been processed. If so, the processing moves to step 913. On the other hand, if there still remains an unprocessed character segmentation rectangle, the next character segmentation rectangle is set as a next rectangle of interest in step 914, and the processing returns to step 905.

If it is determined in step 913 that the determination on all of the regions has ended, the processing ends. If it is determined that there still remains an unprocessed region, the next unprocessed region is set as a region of interest in step 915, and the processing returns to step 903.

In this manner, the region determining unit 2 (505) determines with high precision whether each of character segmentation rectangular regions is a "character image easy to be separated from the background" or a "character image difficult to be separated from the background" based on the number of black pixels (the number of edges) resulting from the logical AND of its thinned image and its edge detected image.

Because a "character image difficult to be separated from the background" (713 in FIG. 7, for example) is removed from the character region information, it is not processed by the MMR compression unit 506. In other words, a "character image difficult to be separated from the background" is compressed by the JPEG compression unit 510 along with its background image without binarization.

In this manner, whether a given image is a character image degraded by binarization or not is determined. Thus, degradation of the character image may be prevented.

Figure 9:
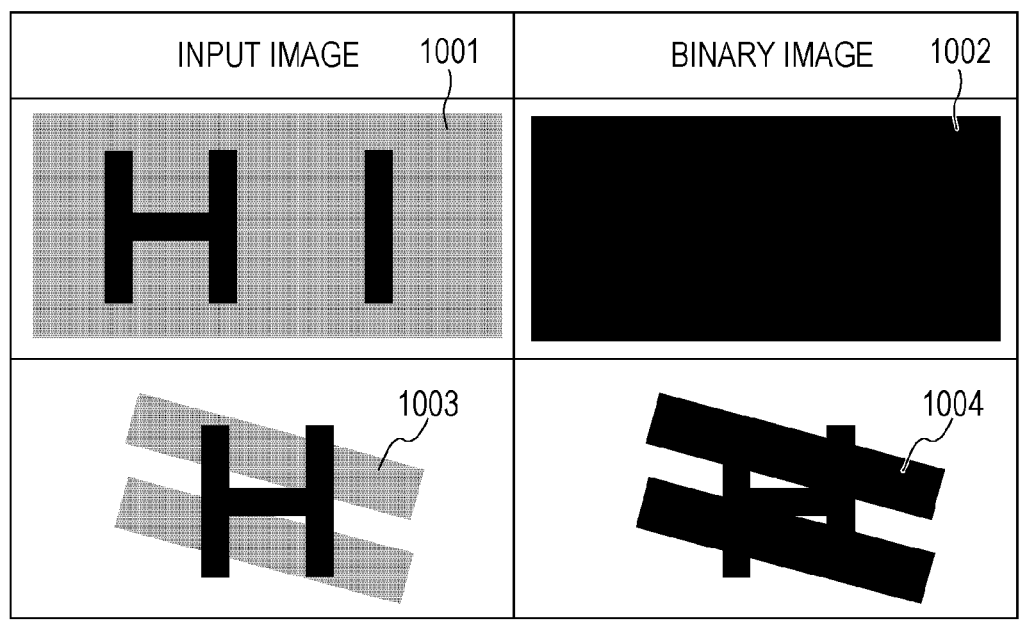
FIG. 9 illustrates an example of an input image according to the first exemplary embodiment.

Having described that according to this exemplary embodiment one character "H" as in images 406 and 408 in FIG. 4 is determined as a "character image difficult to be separated from the background (character image degraded by binarization)", for example, the embodiment is not limited thereto. For example, two or more characters may be handled as in an input image 1001 in FIG. 9. Binarization of the input image 1001 results in a binary image 1002. A character image degraded by binarization is not necessarily rectangular but may be an image having a part of the character image degraded as in an image 1003 in FIG. 9, for example. Binarization on the input image 1003 results in a binary image 1004.

Next, another configuration of the region determining unit 2 (505) will be described.

According to another configuration, (A) an image input to the region determining unit 2 is first divided into a region having a greater density than a threshold value and a region having an equal or lower density than the threshold value (by using binarization, ternarization or other method). As a result, regions 402 and 408 may be acquired, for example.

(B) Edge pixels are extracted (by using an extraction method as described above) from a region determined as having a density greater than the threshold value (H region in the image 401 or an entire region of the image 406) in the input image. This edge extraction process is not performed on an end part (such as one or two pixels inside from the end) of a region determined as having a density greater than the threshold value. In other words, according to the configuration in (B), edge pixels at a predetermined distance or longer (inside) from an end part of a region determined as having a density greater than the threshold value are extracted. According to an alternative configuration, edge pixels including in such an end part (pixels not at a predetermined distance or longer) may be extracted, and then edge pixels in such an end part are removed. Thus, the same result as the resulting images 405 and 411 may be acquired. While the predetermined distance in this example is 3 pixels, it may be other values.

(C) Subsequently, the number of the resulting edge pixels is counted, and whether the number of the edge pixels is greater than the threshold value th or equal to lower than the threshold value th is determined.

Thus, the same result (or a result of determination whether "character image difficult to be separated from the background" or "character image easy to be separated from the background") as that of the aforementioned method may be acquired. Edge pixels may be extracted from an entire image input to the region determining unit 2, instead of the processing in (B). In this case, an end part of a region determined as having a density greater than the threshold value and a region having an equal to or lower than the threshold value are excluded from edge pixels extracted from an entire input image. Thus, the same result as that of the configuration (B) may be acquired.

Figure 16:
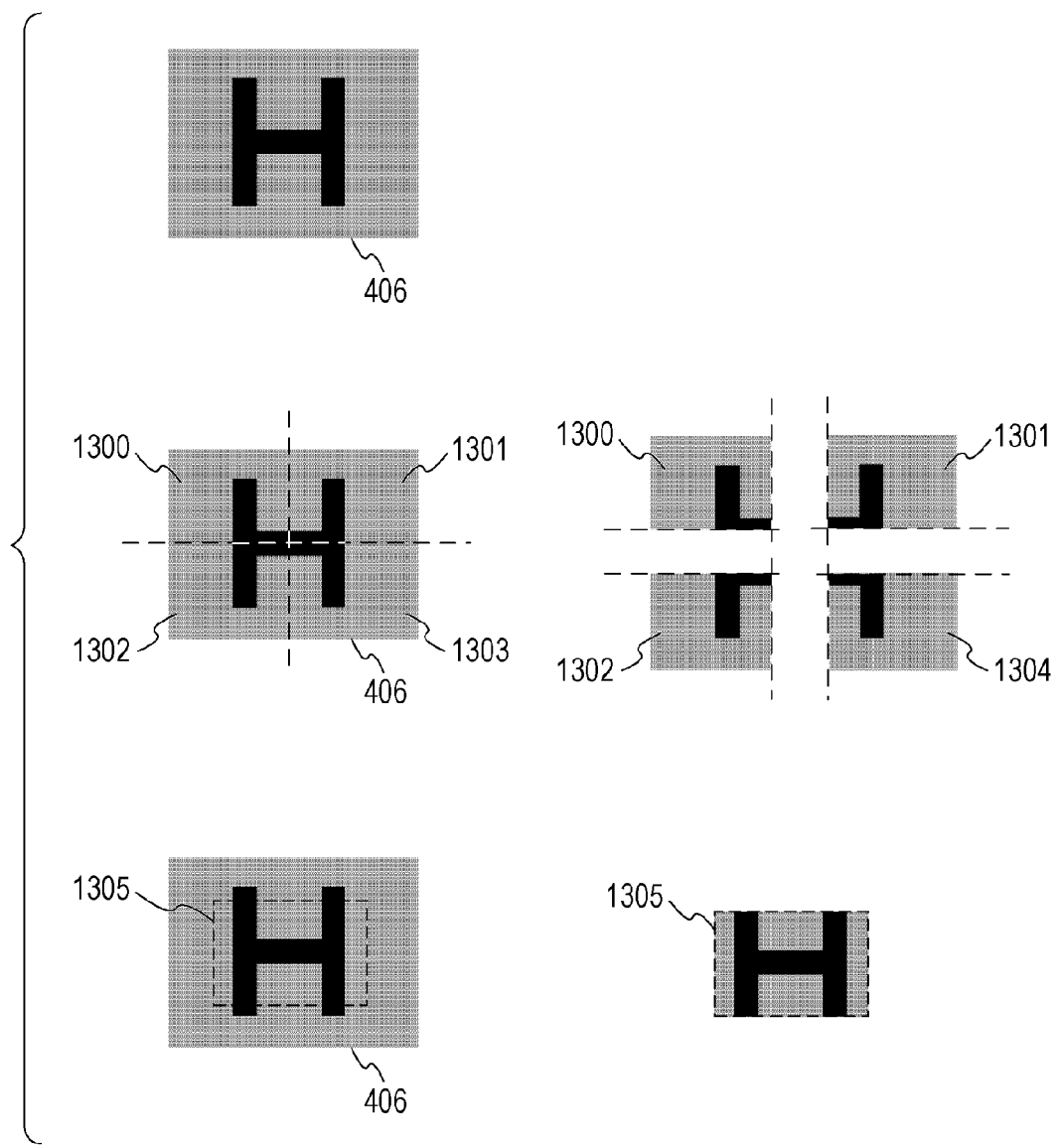
FIG. 16 illustrates samples according to the first exemplary embodiment.

The processing in characters on a result of the character segmentation in step 904 performed by the character segmenting unit 504 has been described according to this exemplary embodiment. The processing may be performed on sectional regions acquired by segmenting each of characters instead of the processing in characters. For example, a region may be equally divided into four sectional regions for the character segmenting unit 504, and the processing may be performed on each of the regions. For example, FIG. 16 illustrates images 1300 to 1304 which are acquired by equally segmenting the character segmented region 406 into 4. The processing is performed on each of the images 1300 to 1304. Alternatively, the determination may be performed on a center part of a character segmented region (such as only 60% of a center part of a character-segmented region). For example, FIG. 16 further illustrates an image 1305 which is an extraction of 60% of a center part of the character-segmented region 406, and the processing may be performed on the image 1305. A combination of the determination on character-segmented regions and the determination on the character-segmented regions and/or a center part thereof may allow determination of whether the image is a "character image easy to be separated from the background" or a "character image difficult to be separated from the background".

Second Exemplary Embodiment

According to the first exemplary embodiment, a region determined as a "character image difficult to be separated from the background" by the region determining unit 2 (505) is not subject to the MMR compression process. According to a second exemplary embodiment, the region determining unit 2 (505) re-executes a binarization process with high precision based on a different algorithm from that of the binarizing unit 502 on a region determined as a "character image difficult to be separated from the background", and pixels of a character image part may be separated from a background. In this case, performing the MMR compression process on a character region resulting from the re-binarization process with high precision may contribute to improvement of image quality of the character region. For example, because the region 713 in FIG. 7 is determined as a "character image difficult to be separated from the background", a region 7013 in the input image 701 corresponding to the region 713 is only binarized with a different threshold value from that for other regions. As a result, a binary image like the image 714 in FIG. 7 may be generated, and the character region may be MMR compressed. An example of the re-binarization process with high precision may be a method for performing a binarization process by using an average value of the density or luminance of a subject region as the threshold value instead of a binarization process by using a fixed threshold value.

Third Exemplary Embodiment

According to the first exemplary embodiment, an input image having a relatively higher character quality like the image 401 in FIG. 4 has been described, for example. However, performing the edge detection process on an image (such as a scan document or a compressed image) having a poor character quality and more noise like the image 1101 in FIG. 10 may cause many edges within the character like an image edge detected image 1102 in FIG. 12. Such edge appearance may become more significant particularly within a large character.

Here, edges within a character may easily remain in a logical AND image 1104 acquired from the edge detected image 1102 and a thinned image 1103. Many edges remaining inside of a character may read wrong determination of an actual "character image easy to be separated from the background" as a "character image difficult to be separated from the background".

According to a third exemplary embodiment, increasing the amount of reduction of the thinning process performed by the thinning unit 301 may reduce edges remaining inside a character in a case where a subject character-segmented region has a larger size. The processing will be described with reference to images 1105 to 1112 in FIG. 10.

An input image 1105 having poor character quality and more noise contains a small character. An edge detected image 1106 is a result of an edge detection process executed on the image 1105 having a small character. A thinned image 1107 is a result of a thinning process executed on the image 1105 having a small character. The thinning process may use a 5×5 window and include replacing a pixel of interest (center of a 5×5 window) by a white pixel if the 5×5 window has at least one white pixel.

A logical AND image 1108 is a result of a logical AND of the edge detected image 1106 and the thinned image 1107. Here, even a small character in an input image having poor character quality and more noise has fewer edges, compared with the logical AND image 1104 having a large character.

A large character image 1109 (identical to the character image 1101) is in an input image having poor character quality and more noise. An edge detected image 1110 is a result of the edge detection process executed on the large character image 1109. A thinned image 1111 is a result of the thinning process executed on the large character image 1109. The thinning process on a large character image may use a 9×9 window and include replacing a pixel of interest (center of a 9×9 window) by a white pixel if the 9×9 window has at least one white pixel. In other words, changing the size of a window based on the size of a subject character image (size of a subject character-segmented region) may increase the amount of reduction of the thinning process. The size of the window is given for illustration purpose only and is not limited to 5×5 or 9×9.

A logical AND image 1112 is a result of a logical AND of the edge detected image 1110 and the thinned image 1111. The logical AND image 1112 has fewer edges than the logical AND image 1104. Therefore, even an image having a large character with much noise may be determined as a "character image easy to be separated from the background" by reducing the amount of reduction of the thinning process if the size of the character image is large.

According to the third exemplary embodiment, the control of the amount of reduction of the thinning process to be performed by the thinning unit based on the size of a subject character-segmented region may reduce an influence of noise, for example, and allow the determination with high precision even in a case where an input image is a scan document, as described above.

Fourth Exemplary Embodiment

Next, details of the processing to be performed by the edge detecting unit (302) within the region determining unit 2 (505) in FIG. 5 will be described with reference to FIG. 11. The edge detecting unit (302) includes a variance value detecting unit 1001, an edge determination threshold value calculating unit 1002, and an edge extracting unit 1003. The processing to be performed by the edge detecting unit (302) will be described in more detail further with reference to FIG. 12. FIG. 12 illustrates input images 1101, 1102, and 1103 segmented in character segmentation rectangles with reference to the character segmentation rectangle information, like the images 401 and 406 illustrated in FIG. 4. The input images 1101, 1102, and 1103 are image examples having different signal values from each other when they are acquired by the scanner unit 201. More specifically, they have signal values represented by a L*a*b* color system where L* represents brightness, and a* and b* represent chromaticity. Notably, while this embodiment applies a L*a*b* color system, an embodiment of the present disclosure is not limited thereto. For example, the same processing may be performed with a signal value in a different color space such as an RGB (red, green, blue) color system. The region 1104 of the image 1101 has a signal value of $\{L^*, a^*, b^*\}=\{128, -50, +30\}$. The region 1105 has a signal value of $\{L^*, a^*, b^*\}=\{128, +50, -60\}$.

FIG. 12 illustrates an example in which there is a difference in large signal value between the regions 1104 and 1105. On the other hand, the region 1106 in the image 1102 has a signal value of $\{L^*, a^*, b^*\}=\{128, -50, +30\}$. The region 1107 has a signal value of $\{L^*, a^*, b^*\}=\{128, -60, +30\}$. FIG. 12 illustrates an example in which there is a small difference in signal value between the regions 1106 and 1107. The region 1108 in the image 1103 has a signal value of $\{L^*, a^*, b^*\}=\{128, -50, +30\}$. The region 1109 has a signal value of $\{L^*, a^*, b^*\}=\{128, -52, +30\}$. FIG. 12 illustrates an example in which there is substantially no difference in signal value between the regions 1108 and 1109. For example, in a case where the edge detecting unit (302) performs an edge detection based on a result of comparison in signal value simply between adjacent pixels or an edge detection by filtering, instead of the aforementioned configuration may cause the following problems. That is, with some threshold values, an edge may be acquire at a boundary between the regions 1104 and 1105 in the image 1101 while no edge may be acquired at a boundary between the regions 1106 and 1107 in the image 1102. Furthermore, with a threshold value which allows acquisition of an edge at the boundary between the regions 1106 and 1107 in the image 1102, an edge may be acquired at the boundary between the regions 1108 and 1109 in the image 1103. As a result, scanning variations of a scanner and small noise such as Jpeg noise may be detected as edges disadvantageously.

Figure 11:
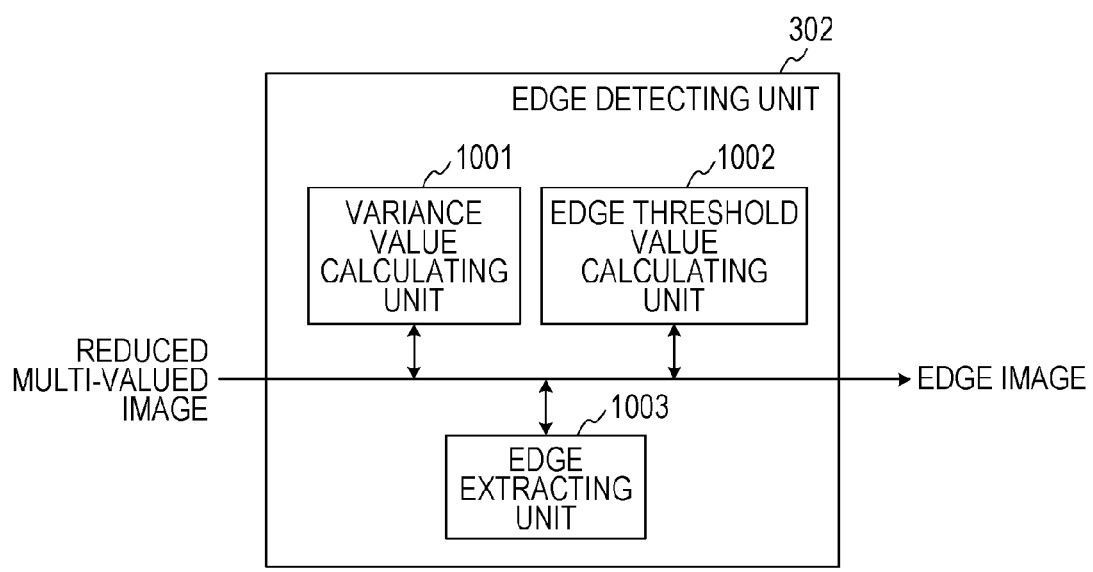
FIG. 11 is a block diagram of an edge detecting unit according to a fourth exemplary embodiment.

FIG. 11 illustrates a configuration for solving those problems. The variance value detecting unit 1001 corresponds to a calculation unit configured to calculate a variance value of a signal value of an input image segmented in character segmentation rectangles. For example, the variance value may be calculated by the following expression:

$$\text{Variance } V = \frac{\sum_{i=j}^{n}(Xi - Xave)^2}{n}$$

Here, n is a number of pixels of a segmented input image, Xi (i=1, 2, . . . , n) is a signal value of each pixel (L*, a*, b* values in this exemplary embodiment), and Xave is an average of signal values of the number of pixels within the region. A variance value with L*, a*, b* values is acquired in this exemplary embodiment, but an embodiment of the present disclosure is not limited thereto. For example, a covariance value may be acquired with a*, b* signal values. In the example input images 1101, 1102, and 1103 illustrated in FIG. 12, because the input image 1101 has a large signal value difference, a greater variance value may be acquired. Because the input images 1102 and 1103 have smaller signal value differences, relatively lower variance values may be acquired.

An expression "threshold value for easy edge acquisition" in the following descriptions may refer to a threshold value that allows determination of an edge even when there is a small signal value difference between adjacent pixels. On the other hand, an expression "threshold value for difficult edge acquisition" in the following descriptions refers to a threshold value with which an edge is not determined if a signal value difference is not large and if a signal value difference is small.

The edge determination threshold value calculating unit 1002 calculates a threshold value for performing edge extraction based on the variance value calculated by the variance value detecting unit 1001. For example, a threshold value for difficult edge acquisition is allocated to an image having a large variance value as in the image 1101. On the other hand, a threshold value for easy edge acquisition is allocated for the images 1102 and 1103.

The edge extracting unit 1003 is a processing unit configured to perform an edge extraction process based on the threshold value determined by the edge determination threshold value calculating unit 1002. The processing may be performed by a general-purpose method by which, for example, a signal value difference between close pixels is acquired by comparing them and whether the difference is greater than a specific threshold value or not is determined. Alternatively, an amount of edge may be acquired by using a filter for calculating a primary differential value, and whether it is greater than a specific threshold value or not may be determined.

For segmentation based on a condition calculated by the edge determination threshold value calculating unit 1002, a threshold value for difficult edge acquisition is allocated to the input image 1101 for the edge extraction. For example, an example in which the threshold value determined based on a variance value is 5 will be described. When the threshold value is used, an edge between the regions 1104 and 1105 may be extracted securely because there is a large signal value difference between the regions 1104 and 1105. This may result in an edge image 1110. On the other hand, a threshold value for easy edge acquisition is allocated to the input image 1102 though there is a small signal value difference between the regions 1106 and 1107 so that an edge between the regions 1106 and 1107 may be extracted. This may result in an edge image 1111. A threshold value for easy edge acquisition is allocated to the input image 1103, but the signal value difference between the regions 1108 and 1109 is significantly smaller than the signal value difference between the regions 1106 and 1107. Thus, even with a threshold value for easy edge acquisition, an edge present between the regions 1108 and 1109 may not be extracted. This may result in an edge image 1112.

Figure 13:
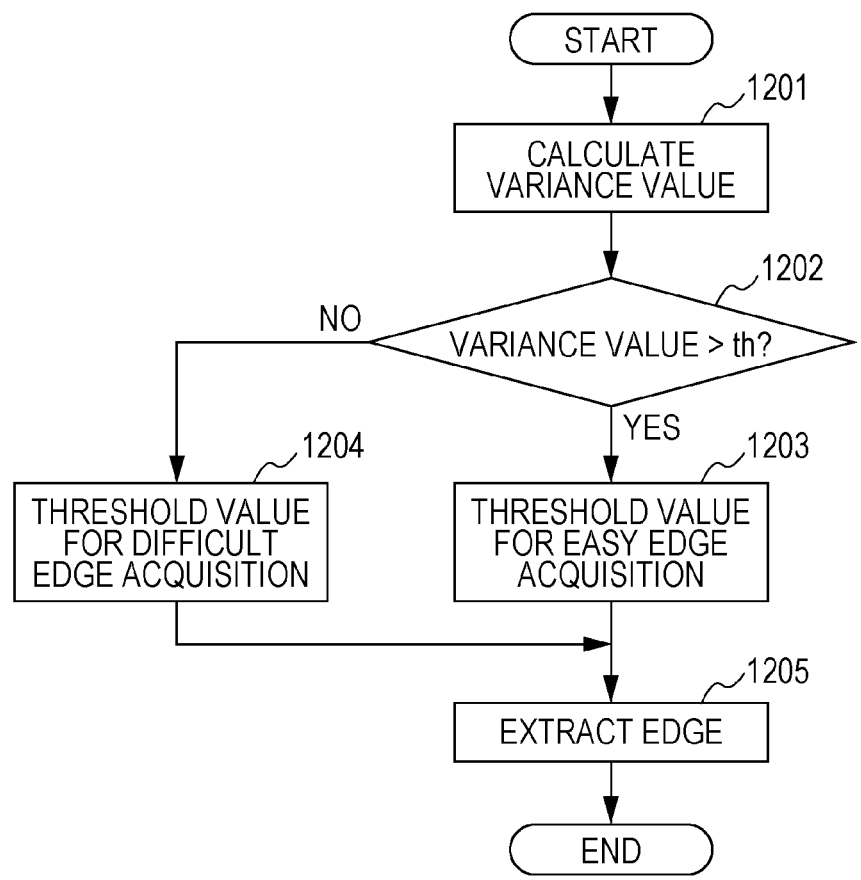
FIG. 13 is a flowchart of the edge extraction according to the fourth exemplary embodiment.

Next, the edge detecting unit (302) in FIG. 11 will be described with reference to the flowchart in FIG. 13. FIG. 11 will be further referred in the following description.

First, in step 1201, a variance value calculating unit (1001) calculates a variance value of a signal for an input image (501). In this case, variance values for all three channels may be calculated if the image has three channels, or one variance value may be calculated by merging them into one channel.

Next, in step 1202, an edge threshold value calculating unit (1002) determines whether the variance values of signals of the image calculated in step 1201 are equal to or greater than a predetermined value or not. If they are equal to or greater than the predetermined threshold value, a "threshold value for easy edge acquisition" is acquired in step 1203. If they are lower than the predetermined threshold value on the other hand, a "threshold value for difficult edge acquisition" is acquired in step 1204.

Finally, in step 1205, an edge extracting unit (1003) performs an edge extraction process based on the threshold value determined in step 1203 or 1204.

According to this exemplary embodiment, it is configured such that the threshold value is adaptively changed based on variance values of each image segmented for each character segmentation rectangle before an edge extraction process is performed thereon, as described above. This allows s segmentation with high precision between a "character image difficult to be separated from the background" and a "character image easy to be separated from the background".

Fifth Exemplary Embodiment

According to the fourth exemplary embodiment, a method has been described which changes a threshold value based on a variance value of a signal value for threshold value calculation before an edge extraction process is performed. In a case where an input image is a polychrome image with three channels, for example, an equal number of variance values to the number of channels may be calculated for use in determination of a threshold value with high precision. However, in a case where an input image is a gray-scale image and therefore has one channel, one variance value may be used for the threshold value calculation, making it difficult to calculate a threshold value with high precision.

Figure 14:
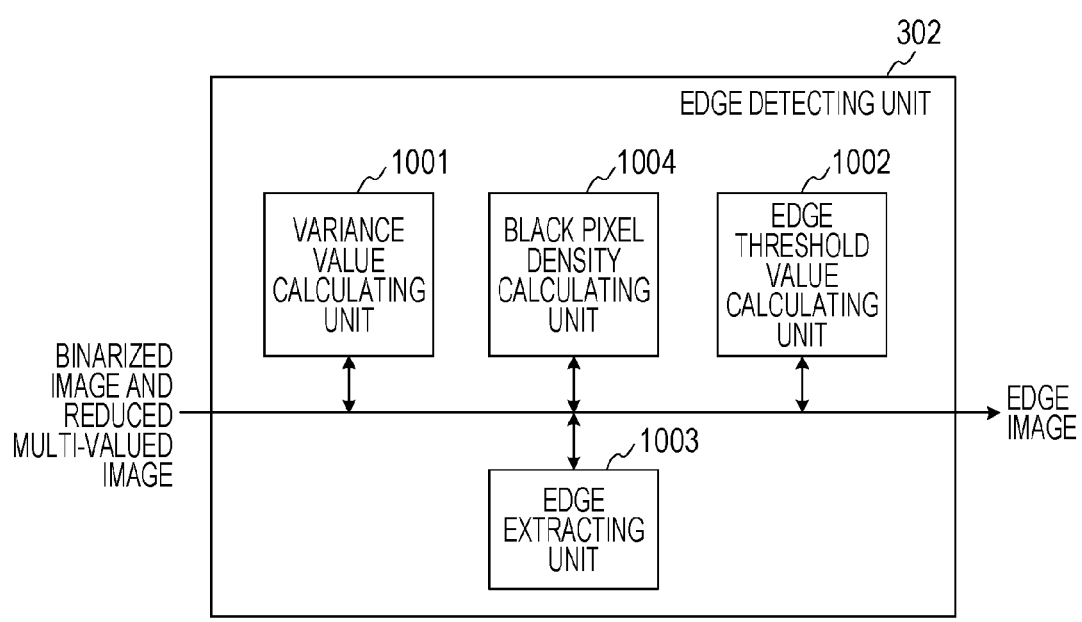
FIG. 14 is a first block diagram of an edge detecting unit according to a fifth exemplary embodiment.

According to this exemplary embodiment, the edge detecting unit (302) further includes a black pixel density calculating unit 1004 in addition to the variance value detecting unit 1001, edge determination threshold value calculating unit 1002, and edge extracting unit 1003, as illustrated in FIG. 14. This configuration is also applicable to a binarized image in addition to an input image.

The black pixel density calculating unit 1004 is configured to calculate a ratio of the number of black pixels to a dimension of a character segmentation rectangle based on an input binarized image. The number of black pixels is counted within an input binarized image, and the count is divided by a dimension of a character segmentation rectangle.

Next, the edge threshold value calculating unit 1002 calculates an optimum threshold value based on the black pixel density calculated by the black pixel density calculating unit 1004. Also in this case, a threshold value for edge extraction is calculated based on the black pixel density similarly to the change of a threshold value for edge extraction based on a variance value according to the first exemplary embodiment. More specifically, if the black pixel density is high, a "threshold value for easy edge acquisition" is set. If the black pixel density is low, a "threshold value for difficult edge acquisition" is set. Setting in this manner may allow edge extraction with a "threshold value for easy edge acquisition" for precise calculation of edges because a "character over a high-density background" has a high black pixel density.

It should be noted that both of a threshold value calculated based on a variance value and a threshold value calculated based on a black pixel density may be used for calculating a threshold value for edge extraction though use of either one is also possible. In this case, though a "threshold value for easy edge acquisition" is desirable from viewpoint of acquisition of more edges, selection of a "threshold value for difficult edge acquisition" is also possible. Priority may be given to a threshold value calculated based on a variance value, for example, by switching the weight on the threshold values.

Figure 15:
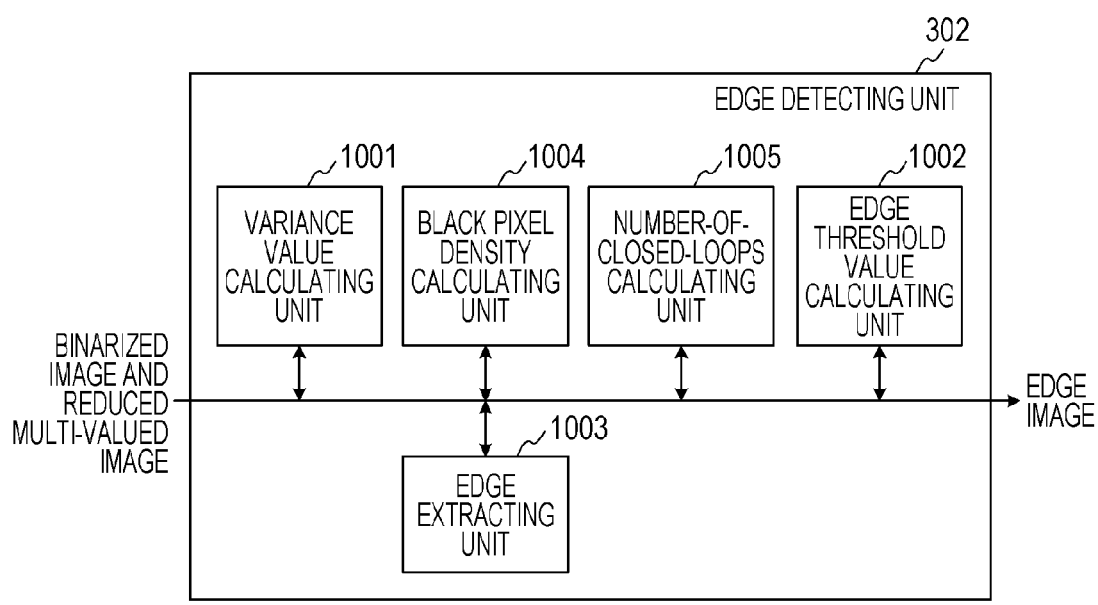
FIG. 15 is a second block diagram of an edge detecting unit according to the fifth exemplary embodiment.

As illustrated in FIG. 15, the edge detecting unit (302) may further include a number-of-closed-loop calculating unit 1005 in addition to the variance value detecting unit 1001, edge determination threshold value calculating unit 1002, edge extracting unit 1003, and black pixel density calculating unit 1004.

The number-of-closed-loop calculating unit 1005 is a calculating unit configured to perform a labeling process for calculating the number of closed loops formed by successive pixel in a white part of an input binarized image.

Next, the edge threshold value calculating unit 1002 calculates an optimum threshold value based on the number of closed loops calculated by the number-of-closed-loop calculating unit 1005. Similarly to the first exemplary embodiment again, a threshold value to be used for edge extraction may be calculated based on the number of closed loops. More specifically, for a greater number of closed loops, a "threshold value for difficult edge acquisition" is used. For a lower number of closed loops, a "threshold value for easy edge acquisition" is used.

This processing allows calculation of an optimum threshold for edge extraction even for an image, such as a gray scale image, which has a lower number of channels and for which a threshold value for edge extraction may not be calculated based on a variance of a signal value.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-262763, filed Dec. 19, 2013, Japanese Patent Application No. 2014-054163, filed Mar. 17, 2014, and Japanese Patent Application No. 2014-139870, filed Jul. 7, 2014, which are hereby incorporated by reference herein in their entirety.

What is claimed is:

1. An image processing apparatus comprising:
a binarizing unit configured to generate a binary image by executing a binarization process on an input image;
a first determining unit configured to determine a character region within the binary image;
a character segmenting unit configured to acquire a region surrounding a character contained in the character region as character segmentation rectangle information;
a thinning unit configured to acquire a thinned image by executing a thinning process on a region within the binary image, the region being identified based on the character segmentation rectangle information;
an edge detecting unit configured to acquire an edge detected image by executing an edge detection process on the region identified based on the character segmentation rectangle information;
a logical operation unit configured to take a logical AND of the thinned image and the edge detected image;
a second determining unit configured to determine, based on a result of the logical AND performed by the logical operation unit, whether the character identified based on the character segmentation rectangle information is a character to be separated from a background by the binarization process or not; and
an image processing unit configured to perform a predetermined image process for a character on the region being identified based on the character segmentation rectangle information based on determination of the second determining unit that the character identified based on the character segmentation rectangle information is a character to be separated from a background by the binarization process,
wherein the image processing unit does not perform the predetermined image process for a character on the region being identified based on the character segmentation rectangle information based on determination of the second determining unit that the character identified based on the character segmentation rectangle information is not a character to be separated from a background by the binarization process,
wherein the units are implemented by one or more processors, a circuitry, or a combination thereof.

2. The image processing apparatus according to claim 1, further comprising:
a first compression unit configured to execute a binary reversible compression process on a character determined by the second determining unit as a character to be separated from a background by the binarization process; and
a second compression unit configured to execute a multi-valued non-reversible compression on a character determined by the second determining unit as a character not to be separated from the background by the binarization process,
wherein the first compression unit and the second compression unit are implemented by one or more processors, a circuitry or a combination thereof.

3. The image processing apparatus according to claim 2, further comprising a color extracting unit configured to extract a character color of the character determined by the second determining unit as a character to be separated from the background by the binarization process,
wherein the color extracting unit is implemented by one or more processors, a circuitry or a combination thereof.

4. The image processing apparatus according to claim 1, further comprising a reducing unit configured to acquire a reduced multi-valued image by reducing the input image, wherein
the edge detecting unit acquires the edge detected image by executing an edge detection process on the region identified based on the character segmentation rectangle information in the reduced multi-valued image,
wherein the reducing unit is implemented by one or more processors, a circuitry or a combination thereof.

5. The image processing apparatus according to claim 1, wherein the edge detecting unit acquires the edge detected image by executing an edge detection process on a region identified based on the character segmentation rectangle information in the input image.

6. The image processing apparatus according to claim 1, wherein
the logical operation unit generates a logical AND image by taking a logical AND of the thinned image and the edge detected image; and
the second determining unit determines whether a character identified based on the character segmentation rectangle information is a character to be separated from a background by the binarization process or not based on a number of black pixels contained in the logical AND image generated by the logical operation unit.

7. The image processing apparatus according to claim 1, further comprising a re-binarizing unit configured to execute a re-binarization process on a character determined by the second determining unit as a character not to be separated from a background by the binarization process.

8. The image processing apparatus according to claim 1, wherein the thinning unit changes an amount of reduction of the thinning process in accordance with a size of a region identified based on the character segmentation rectangle information.

9. An image processing method executed by at least one processor, the image processing method comprising:
generating a binary image by executing a binarization process on an input image;
determining a character region within the binary image;
acquiring a region surrounding a character contained in the character region as character segmentation rectangle information;
acquiring a thinned image by executing a thinning process on a region within the binary image, the region being identified based on the character segmentation rectangle information;
acquiring an edge detected image by executing an edge detection process on the region identified based on the character segmentation rectangle information;
taking a logical AND of the thinned image and the edge detected image;
determining, based on a result of the logical AND performed by the taking, whether the character identified based on the character segmentation rectangle information is a character to be separated from a background by the binarization process or not; and
performing a predetermined image process for a character on the region being identified based on the character segmentation rectangle information based on determination of the determining that the character identified based on the character segmentation rectangle information is a character to be separated from a background by the binarization process,
wherein the performing does not perform the predetermined image process for a character on the region being identified based on the character segmentation rectangle information based on determination of the determining that the character identified based on the character segmentation rectangle information is not a character to be separated from a background by the binarization process.

* * * * *